United States Patent [19]

Sekimoto et al.

[11] Patent Number: 4,504,119

[45] Date of Patent: Mar. 12, 1985

[54] ONE-DIMENSIONAL LIQUID CRYSTAL SCANNER

[75] Inventors: Souichi Sekimoto; Ryoki Kato, both of Kanagawa, Japan

[73] Assignee: Fuji Xerox Co., Ltd., Kanagawa, Japan

[21] Appl. No.: 534,892

[22] Filed: Sep. 22, 1983

Related U.S. Application Data

[62] Division of Ser. No. 295,284, Aug. 24, 1981, Pat. No. 4,431,913.

[30] Foreign Application Priority Data

Dec. 4, 1980 [JP] Japan .................. 55-170252

[51] Int. Cl.³ .................. G02F 1/13; G03B 27/72; H04N 1/06; H04N 1/024
[52] U.S. Cl. .................. 350/336; 358/293; 358/302
[58] Field of Search .................. 350/336, 332; 358/293, 358/294, 302, 213; 250/551; 355/71, 3 R

[56] References Cited

U.S. PATENT DOCUMENTS 3,781,085 12/1973 Leibowitz .................. 350/336

FOREIGN PATENT DOCUMENTS 28089 2/1980 Japan .................. 350/336
93320 6/1982 Japan .................. 350/336
917164 4/1982 U.S.S.R. .................. 350/332

Primary Examiner—Edward P. Westin
Attorney, Agent, or Firm—Sughrue, Mion, Zinn, Macpeak & Seas

[57] ABSTRACT

A one-dimensional scanner for use in an image reader in which the pitch of the electrode elements is reduced to increase the image density. An upper electrode array has a plurality of upper electrode elements arranged at a predetermined pitch and spacing in a one-dimensional scanning direction while a lower electrode array similarly has a plurality of lower electrode elements arranged at a predetermined pitch and spacing in the one-dimensional scanning direction in an opposed, spaced and staggered relation with respect to the upper electrode elements wherein each lower electrode element is positioned across two adjacent upper electrode elements thereby defining a picture element region therebetween. A layer of material such a photosensitive material, a layer having an electro-optical effect, or a layer of electric-radiant-energy-converting material is disposed between the upper and lower electrode arrays. A scanning device is provided which selects respective pairs of the upper and lower electrode elements which overlap each other sequentially in the one-dimensional scanning direction. At least one of the upper and lower electrodes is light transmissible.

2 Claims, 14 Drawing Figures

ONE-DIMENSIONAL LIQUID CRYSTAL SCANNER

This is a division of application Ser. No. 295,284 filed Aug. 24, 1981, now U.S. Pat. No. 4,431,913.

BACKGROUND OF THE INVENTION

The present invention relates to one-dimensional scanners. More particularly, the invention relates to a one-dimensional scanner adapted to reduce the size of picture elements and accordingly increase the density of picture elements without decreasing the widths of the electrodes of conversion elements used to convert an optical image into an electrical signal or to convert a time-series electrical signal into an optical or thermal signal.

An example of an electro-optical conversion element in a conventional one-dimensional scanner is shown in FIGS. 1 and 2.

In FIG. 1, reference numeral 1 designates the electro-optical conversion element 1, 2 an upper transparent substrate, 3 an upper transparent electrode composed of a number of upper electrode elements arranged one-dimensionally in a scanning direction at a predetermined interval or pitch, 4 a lower transparent substrate, 5 a lower transparent electrode which is spaced from the upper transparent electrode 3 and provided in the form of a belt extending one-dimensionally in the scanning direction, 6 a liquid crystal layer provided between the upper and lower transparent electrodes 3 and 5, and 7 spacers.

FIG. 2 is an explanatory diagram showing the positional relationship between the upper and lower electrodes between which an electro-optical conversion material such as a liquid crystal layer is interposed.

In FIG. 2, reference characters 3-1, 3-2, ... and 3-n designate the electrode elements of the upper transparent electrode, 5 the lower transparent electrode, and 8 picture cell regions which are formed between the upper transparent electrode 3 (i.e. the upper electrode elements 3-1, 3-2, ... and 3-n) and the lower transparent electrode 5. When a voltage is applied across the upper and lower electrodes, the light-transmissivity of the liquid crystal layer therebetween is varied, thus controlling the incident light.

FIG. 3 illustrates the case where the electro-optical conversion element thus constructed is employed as a light valve one-dimensional scanner.

In FIG. 3, reference numeral 22 designates a photosensitive drum, 1a a light valve one-dimensional scanner disposed adjacent to the upper portion of the photo-sensitive drum 22, 21 the one-dimensional mask of the light valve one-dimensional scanner, and 20 a uniform, one-dimensional irradiation light beam.

First, the electro-optical conversion element 1 is irradiated one-dimensionally by the one-dimensional irradiation light beam 20 from above the upper transparent substrate 2. Then, in response to input signals, voltages are applied to the electrode elements one after another while the picture cell regions 8 are being scanned to thus vary the light-transmissivity of the liquid crystal layer 6 and thereby to control the amount of light which passes through the scanner.

In the employment of the above-described electro-optical conversion element, the density of the raster image (i.e. the picture element size) is defined by the pitch of the upper transparent electrode elements 3-1, 3-2, ... and 3-n.

The electro-optical conversion element described above suffers from a drawback that, if it is desired to increase the image density (i.e. to increase the resolution by decreasing the picture element size), it is impossible to do so by decreasing the width and the pitch of the upper transparent electrode elements 3-1, 3-2, ... and 3-n because decreasing the width and pitch is limited by manufacturing considerations. For instance, the minimum picture of the electrode elements of an electro-optical conversion elements which can be manufactured using practical processes for an original 300 mm in width is of the order of 50 $\mu$m.

FIG. 4 is a sectional view of a conventional one-dimensional image reading element (RIS), i.e. a conventional photoelectric conversion element. In FIG. 4, reference numeral 19 designates the upper electrode, 17 the lower electrode composed of a number of lower electrode elements which are spaced from the upper electrode 19 and are arranged at a predetermined interval or pitch, 18 a photosensitive material layer provided between the upper and lower electrodes 19 and 17, and 16 the lower substrate.

Also in a one-dimensional image reading element in which, as shown in FIG. 4, the upper electrodes 19 or the lower electrode 17 is made transparent or at least one side (or the light incidence side) of the two sides of the lower substrate 16 is made transparent and a photosensitive material layer is interposed therebetween, and hence similar to the case of FIG. 1, the image density is defined by the pitch of the electrode elements. Thus, the one-dimensional image reading element is disadvantageous in that is is impossible to decrease the pitch of the electrode elements because of the structure and accordingly it is impossible to increase the image density.

SUMMARY OF THE INVENTION

An object of the invention is thus to provide a one-dimensional scanner in which the above-described drawbacks have been eliminated by improving the structure of the electro-optical element, and wherein an image having a high picture element density is obtained with the size of picture elements reduced.

In order to achieve the aforementioned and other objects, in accordance with the invention, the widths (W-1) and (W-2) of the upper and lower electrode elements of an electro-optical conversion element and the pitch P of both of the upper and lower electrode elements are defined so as to satisfy the expression (W-1)+(W-2)>P, and the upper electrode elements are arranged in a staggered relation with respect to the lower electrode elements so that they overlap one another.

DESCRIPTION OF THE PREFERRED EMBODIMENTS

Preferred embodiments of the invention will be described with reference to the accompanying drawings.

Figure 5:
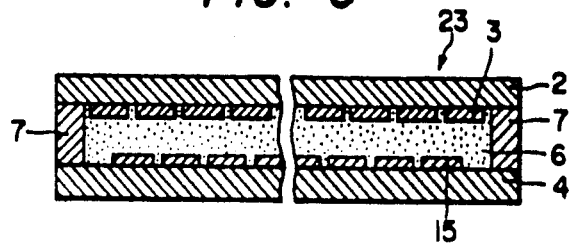
FIG. 5 is a cross-sectional view of a one-dimensional scanner of the present invention.
Figure 6:
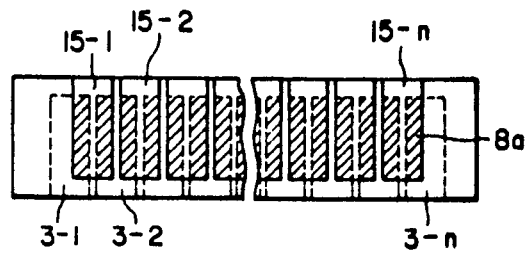
FIG. 6 illustrates the positional relationship between the upper and lower electrodes of FIG. 5 with a layer of electro-optical converting material interposed therebetween.

FIG. 5 is a sectional view of a first embodiment of a one-dimensional scanner of the invention applied to an image reproducing device. FIG. 6 is an explanatory diagram showing the positional relationships between the upper and lower electrode arrays, between which an electro-optical conversion material layer (such as a liquid crystal layer) is interposed.

Figure 1:
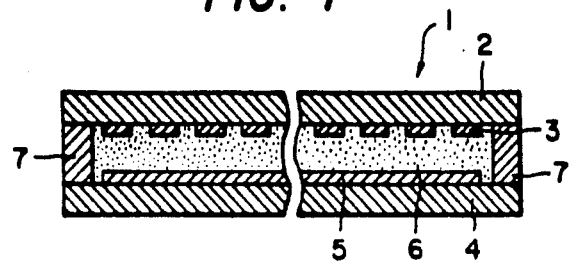
FIG. 1 is a cross-sectional view of an electro-optical conversion element used in a conventional one-dimensional scanner.
Figure 2:
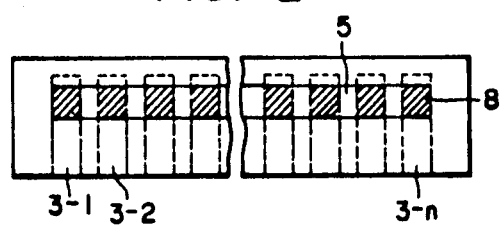
FIG. 2 illustrates the positional relationship of upper and lower electrode elements with a converting material interposed therebetween in FIG. 1.

In FIGS. 5 and 6, those components which have been previously described with reference to FIG. 1 are therefore similarly numbered.

In FIGS. 5 and 6, reference numeral 23 designates an image reproducing device, and 15 the lower transparent electrode array composed of electrode elements 15-1, 15-2, . . . and 15-n which are arranged in an opposed relationship to the electrode elements 3-1, 3-2, . . . and 3-n of the upper transparent electrode array 3. The electrode element widths W-1 and W-2 and the pitch P of the electrode elements are defined by the following expression:

$$(W-1)+(W-2)>P.$$

Picture element regions 8a are formed between the upper transparent electrode elements 3-1, 3-2, . . . and 3-n and the lower transparent electrode elements 15-1, 15-2, . . . and 15-n which overlap. As is apparent from the figure, when voltages are applied across the upper and lower electrode elements, the light transmissivity of the liquid crystal layer sandwiched therebetween is varied in accordance with the applied voltages to control the incident light.

Figure 3:
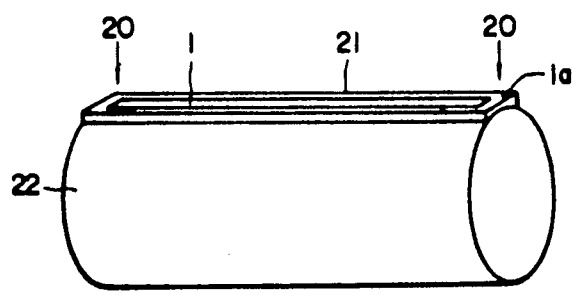
FIG. 3 illustrates the positional relationship of a one-dimensional scanner with a photosensitive drum.
Figure 4:
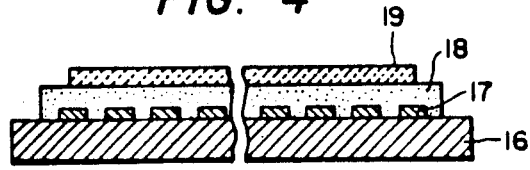
FIG. 4 is a cross-sectional view of a conventional one-dimensional image reading element.

The above-described image reproducing device can be employed as a light valve one-dimensional scanner by replacing the electro-optical conversion element 1 in FIG. 3 by the image reproducing device 23. In this case, the operation is as follows:

First, the uniform, one-dimensional irradiation light beam 20 is caused to one-dimensionally irradiate the upper transparent substrate 2 of the image reproducing device 23. Then, in response to input signals, voltages are applied across the upper and lower electrode elements for the picture element regions 8a to thereby vary the light transmissivity of the liquid crystal 6 therein.

The widths (W-1) and (W-2) of the electrode elements of the upper and lower transparent electrode arrays 3 and 15 and the pitch P of the electrode elements are selected so as to satisfy the above-described expression $(W-1)+(W-2)>P$, and the upper electrode elements and the lower electrode elements are alternately staggered from each other, i.e. the upper electrode elements and the lower electrode elements are overlapped. Accordingly, the area of each picture element region 8a is reduced, that is, smaller picture elements are provided.

Figure 7:
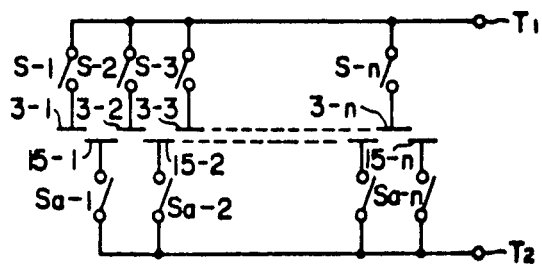
FIG. 7 is a block diagram of a drive circuit incorporated in the scanner of a first embodiment of the present invention.
Figure 8:
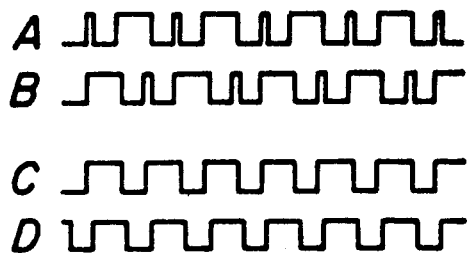
FIG. 8 is a timing chart for the circuit of FIG. 7.

FIG. 7 shows a drive circuit for the above-described embodiment of a one-dimensional scanner, and FIG. 8 is a timing chart for a description of the operation of the drive circuit.

In FIG. 7, reference characters S-1, S-2, . . . and S-n designate switches which are connected to the electrode elements 3-1, 3-2, . . . and 3-n of the upper electrode array 3, respectively, and reference characters Sa-1, Sa-2, . . . and Sa-n designate switches which are connected to the electrode elements 15-1, 15-2, . . . and 15-n of the lower electrode array 15, respectively.

The switches S-1, Sa-1, . . . and S-n and Sa-n are closed by control signals A and B, or C and D, in FIG. 8 successively in the stated order. More specifically, the combinations of closed switches are selected as switches S-1 and Sa-1, Sa-1 and S-2, S-2 and Sa-2 and so forth. As a result, the picture element regions defined by the upper and lower electrode elements are scanned from one end to the other end.

At the same time, a time-series electrical signal voltage is applied across input terminals T1 and T2 to vary the light transmissivity of the picture element regions (or the liquid crystal 6) between the upper electrode elements 3-1, 3-2, . . . and 3-n and the lower electrode elements 15-1, 15-2, . . . 15-n.

Thus, an image corresponding to one scanning line is reproduced on a photosensitive drum as shown in FIG. 3. A reproduced image having a high image density can then be obtained through conventional developing and transferring processes.

Figure 9:
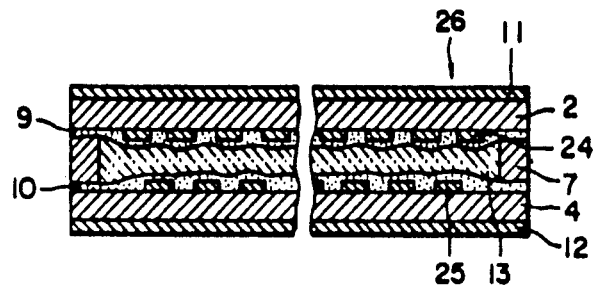
FIG. 9 is a cross-sectional view of a one-dimensional scanner according to a second embodiment of the present invention.

FIG. 9 is a sectional view of a second embodiment of a a one-dimensional scanner of the invention. In FIGS. 9 and 5, like parts are designated by like reference numerals.

In FIG. 9, reference numeral 26 designates a light valve one-dimensional scanner, and 24 and 25 an upper NESA electrode array and a lower NESA electrode array, respectively. The pitch of electrode elements of each of the upper and lower NESA electrode arrays and the positional relationships between the upper and lower NESA electrode arrays are similar to those of the embodiment of FIG. 5.

Further in FIG. 9, reference numeral 113 designates a TN type nematic liquid crystal, 9 and 10 orienting layers which cover the upper and lower NESA electrode arrays 24 and 25 to horizontally orient the TN type nematic liquid crystal 13, 11 a polarizer covering the upper surface of the upper transparent substrate 2, and 12 an analyzer covering the lower surface of the lower transparent substrate 4.

Figure 10:
FIGS. 10 and 11 illustrate characteristics of a TN-type nematic liquid crystal material.
Figure 11:
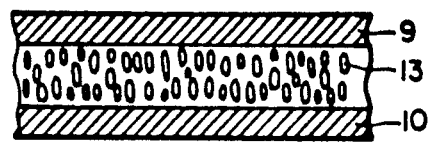

When no voltage is applied across the upper and lower NESA electrode arrays 24 and 25, the orientation characteristic of the TN type nematic liquid crystal 13 is as shown in FIG. 10. When voltage is applied across the electrode arrays 24 and 25, the orientation characteristic is as shown in FIG. 11.

In FIG. 10, reference numerals 9 and 10 designate the above-described upper and lower orienting layers, respectively, and 13 molecules of the above-described TN type nematic liquid crystal 13. The nematic liquid crystal 13 has a positive dielectric anisotropy ($\epsilon>0$) such that, when no voltage is applied thereto, the molecules are arranged twisted 90°. Under this condition, while light passes through the liquid crystal layer, its polarization plane is rotated through 90°. On the other hand, when voltage is applied to the liquid crystal, the molecules are oriented perpendicularly to the upper and lower orienting layers. In this case, the aforementioned rotation phenomenon is not caused.

Figure 12:
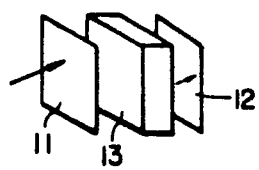
FIG. 12 illustrate the direction of polarization of a polarizer and a photosensor arranged in alignment with a nematic crystalline liquid therebetween.

FIG. 12 shows the polarization directions of the polarizer 11 and the analyzer 12 between which the nematic liquid crystal 13 is provided. As is apparent from FIG. 12, the polarizer 11 and the analyzer 12 are arranged so that their polarization directions are the same.

The operation of the light valve one-dimensional scanner in the case of converting a time-series electrical signal into an optical signal will be described.

The switches S-1, Sa-1, . . . and S-n and Sa-n are closed by control signals A and B, or C and D, as shown in FIG. 8, successively in the stated order. Therefore, the combinations of closed switches are selected as switches S-1 and Sa-1, Sa-1 and S-2, S-2 and Sa-2 and so on. As a result, the picture element regions defined by the upper and lower electrode elements are scanned from one end to the other end.

At the same time, a time-series electrical signal voltage is applied across the input terminals T1 and T2. In this operation, in the picture element regions to which the voltage is applied, the molecules of the liquid crystal which have been arranged parallel to the upper and lower orienting layers 24 and 25 are rearranged perpendicular to the latter. That is, the nematic state is held.

Under this condition, the TN type nematic liquid crystal 13 has no rotational polarization characteristic. As a result, light incident to the polarizer 11 can pass through the analyzer 12 unchanged.

When no voltage is applied across the input terminals T1 and T2, the molecules of the nematic liquid crystal 13 are maintained parallel to the upper and lower orienting layers 24 and 25 thereby providing the rotational polarization characteristic.

As described above, voltage is applied to the electrode elements over one entire line of the light valve one-dimensional scanner so as to cause the TN type nematic liquid crystal 13 to exhibit the rotational polarization characteristic or the nonrotational polarization characteristic, whereby an image having a high image density is produced.

Figure 13:
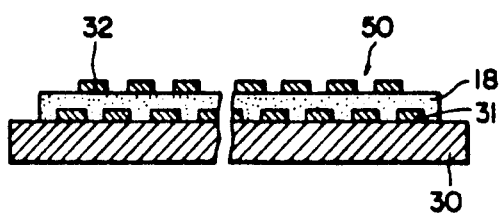
FIG. 13 is a cross-sectional view of a one-dimensional scanner according to a third embodiment of the present invention.

A third embodiment of the invention is shown in FIG. 13. In FIG. 13, reference numeral 50 designates a one-dimensional image reading element, 18 a photosensitive material, 30 a transparent substrate, and 31 and 32 the upper and lower electrode arrays, respectively, of which is light transmissible to allow light to strike the photosensitive material 18. The pitch of the electrode elements of each of the upper and lower electrode arrays and the positional relationships between the upper and lower electrode elements are similar to those of the embodiment of FIG. 5.

In reading an image with the one-dimensional image reading element constructed as described above, similar to the case of FIG. 9, the upper and lower electrode elements are selectively scanned whereby a time-series electrical signal providing a high picture element density is obtained.

Figure 14:
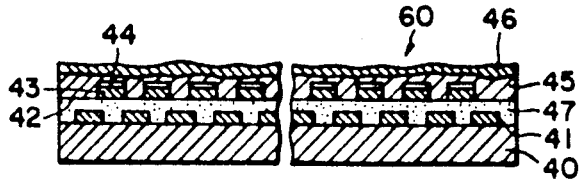
FIG. 14 is a cross-sectional view of a one-dimensional scanner according to a fourth embodiment of the present invention.

FIG. 14 is a sectional view showing a fourth embodiment of the invention applied to an image reproducing device operating according to an electro-thermal conversion system. In FIG. 14, reference numeral 60 designates a thermal head, 40 a substrate, 41 the lower electrode array, 47 a semiconductor (such as a chemical semiconductor) layer, 43 Schottky junction metal layers (or PN junction metal layer) which are joined to the semiconductor layer 47 to provide heat generating junction regions 42, 44 lead electrodes to the Schottky junction metal layers 43, 45 a short-circuit preventing layer, and 46 an outer protective layer.

The pitches of the electrode elements of the lower electrode array 41 and of the Schottky junction metal layer 43 and the positional relationships therebetween are similar to those of the upper and lower electrode arrays in FIG. 5.

The case where a thermal transfer record is formed on a heat-sensitive recording sheet (not shown) with the above-described thermal head, will be described.

As was described with reference to FIGS. 5 and 6, the picture element regions are selectively scanned from one end to the other end, for instance, with the switching device which is described with reference to FIGS. 7 and 8, and a time-series electrical signal corresponding to the selected picture element regions is applied across the lower electrode elements 41 and the lead electrodes 44. As a result, the heat generating junction regions 42 generate heat according to the input image signal heating the portions of the heat-sensitive sheet (not shown) on the thermal head which are in contact with the heat generating junction regions 42.

Light emission from PN junctions may be utilized. In this case, the lead electrodes (or the upper electrode elements) 44, the short-circuit preventing layer 45 and the protective layer 46 in FIG. 14 are to be made of transparent materials, and the Schottky junction metal layers 43 are to be replaced by semiconductor strip layers which form PN junctions with the semiconductor layer 47. Then, the interfaces between the semiconductor strip layers and the semiconductor layer 47 are made to emit light by the above-described voltage applying method. Light thus produced irradiates a photosensitive drum (not shown), as a result of which an image is reproduced using a conventional process.

As described above, in the one-dimensional scanner of the invention, the widths (W-1) and (W-2) of the electrode elements of the upper and lower electrode arrays and the pitch P of the electrode elements of each of the upper and lower electrode arrays are set so as to satisfy the expression (W-1)+(W-2)>P, and the upper electrode elements are arranged in a staggered overlapping relation to the lower electrode elements. With this construction, the one-dimensional scanner of the invention is advantageous in that, while having a simple construction, it provides a transfer image with a high picture element density.

In the above-described embodiment, the upper electrode elements are shown as being different in width from the lower electrode elements. However, the two elements may have the same width.

What is claimed is:

1. A one-dimensional scanner for use as a light valve in an image reproducing device comprising:

an upper electrode having a plurality of upper electrode elements arranged at a predetermined pitch and at a predetermined spacing from each other in a one-dimensional scanning direction;

a lower electrode having a plurality of lower electrode elements arranged at a predetermined pitch and at a predetermined spacing from each other in a one-dimensional scanning direction in an opposed, spaced and staggered relation to said plurality of upper electrode elements, so that each lower electrode element is positioned across two adjacent upper electrode elements thereby defining a first picture element region between said each lower electrode element and one of said two adjacent upper electrode elements and a second picture element region between said each lower electrode element and the other of said two adjacent upper electrode elements;

a layer of material having an electro-optical effect interposed between said upper electrode and said lower electrode; and one-dimensional scanning means adapted to select respective pairs of said upper and lower electrode elements overlapping each other sequentially in said one-dimensional scanning direction, thereby selecting picture element regions one after another in said one-dimensional scanning direction to effect one-dimensional scanning;

time serial electric signals being applied to each pair of selected upper and lower electrode elements, and said upper and lower electrodes being light-transmittable wherein uniform light is irradiated onto said layer from one of said upper and lower electrodes.

2. The one-dimensional scanner for use in an image reproducing device as defined in claim 1 wherein said upper electrode elements of said upper electrode array have a width (W-1), said lower electrode elements of said lower electrode array have a width (W-2), wherein said predetermined pitch of both of said upper electrode array and said lower electrode array is P, and wherein (W-1)+(W-2)>P.

* * * * *